(12) United States Patent
Gao et al.

(10) Patent No.: US 11,119,703 B2
(45) Date of Patent: Sep. 14, 2021

(54) UTILIZING A SET OF VIRTUAL STORAGE UNITS DISTRIBUTED ACROSS PHYSICAL STORAGE UNITS

(71) Applicant: EMC IP Holding Company LLC, Hopkinton, MA (US)

(72) Inventors: Jian Gao, Beijing (CN); Geng Han, Beijing (CN); Xinlei Xu, Beijing (CN); Jianbin Kang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/878,957

(22) Filed: May 20, 2020

(65) Prior Publication Data

US 2021/0124533 A1 Apr. 29, 2021

(30) Foreign Application Priority Data

Oct. 29, 2019 (CN) .......................... 201911039303.3

(51) Int. Cl.
*G06F 3/06* (2006.01)
*G06F 11/10* (2006.01)

(52) U.S. Cl.
CPC .......... *G06F 3/0665* (2013.01); *G06F 3/0607* (2013.01); *G06F 3/0647* (2013.01); *G06F 3/0683* (2013.01); *G06F 11/1092* (2013.01)

(58) Field of Classification Search
CPC .......... G06F 3/012; G06F 16/71; G06F 3/011; G06F 3/017; G06F 3/04815; G06F 3/0607; G06F 3/0664; G06F 3/067
See application file for complete search history.

(56) References Cited

U.S. PATENT DOCUMENTS

2005/0235132 A1* 10/2005 Karr ...................... G06F 3/0607
711/203

* cited by examiner

*Primary Examiner* — Yong J Choe
(74) *Attorney, Agent, or Firm* — BainwoodHuang (57) ABSTRACT

Techniques involve: in response to receiving an access request for a logical address, determining a first virtual storage unit and a first offset within the first virtual storage unit corresponding to the logical address; determining a first set of virtual storage units to which the first virtual storage unit belongs and a position of the first virtual storage unit, determining, from the plurality of physical storage units corresponding to the first set of virtual storage units and based on the position and the first offset, a physical storage unit and a second offset within the physical storage unit corresponding to the logical address; and performing, based on an identifier of the physical storage unit and the second offset, a data access operation requested by the access request. Accordingly, I/O loads on a plurality of disks can be balanced, thereby improving overall performance of a storage system.

19 Claims, 6 Drawing Sheets

UTILIZING A SET OF VIRTUAL STORAGE UNITS DISTRIBUTED ACROSS PHYSICAL STORAGE UNITS

CROSS-REFERENCE TO RELATED APPLICATION

This application claims priority to Chinese Patent Application No. CN201911039303.3, on file at the China National Intellectual Property Administration (CNIPA), having a filing date of Oct. 29, 2019 and having "METHOD, DEVICE AND COMPUTER PROGRAM PRODUCT FOR STORAGE MANAGEMENT" as a title, the contents and teachings of which are herein incorporated by reference in their entirety.

FIELD

Embodiments of the present disclosure generally relate to the field of data storage, and more specifically, to a method, device and computer program product for storage management.

BACKGROUND

In current storage systems, each of a plurality of disks is generally divided into a plurality of disk slices. By combining the plurality of disk slices from different disks into stripes in a disk array (e.g., an independent redundant disk array, RAID), the plurality of disks are organized into the disk array for management. In this case, the entire storage space is managed in fixed-size storage units composed of one or more stripes. Such storage units are also referred to as "physical storage units."

Physical storage units are usually allocated on demand. Since each physical storage unit is only associated with a few disks among a plurality of disks (for example, taking RAID1 as an example, each physical storage unit is only associated with two disks), I/O operations on this physical storage unit will only be served by these few disks. In some cases, data in certain physical storage units will be accessed frequently, which leads to an imbalance in I/O loads among different disks, thereby impacting the overall performance of the storage system.

SUMMARY

Embodiments of the present disclosure provide methods, devices and computer program products for storage management.

In a first aspect of the present disclosure, there is provided a method of storage management. The method includes: in response to receiving an access request for a logical storage address, determining a first virtual storage unit and a first address offset within the first virtual storage unit corresponding to the logical storage address; determining a first set of virtual storage units to which the first virtual storage unit belongs and a position of the first virtual storage unit in the first set of virtual storage units, where the first set of virtual storage units is mapped to a plurality of physical storage units evenly distributed across a first group of disks and including a plurality of virtual storage units, and data in the plurality of virtual storage units being distributed across the plurality of physical storage units in a round-robin manner; determining, from the plurality of physical storage units corresponding to the first set of virtual storage units and based on the position and the first address offset, a physical storage unit and a second address offset within the physical storage unit corresponding to the logical storage address; and performing, based on an identifier of the physical storage unit and the second address offset, a data access operation requested by the access request.

In a second aspect of the present disclosure, there is provided an electronic device for storage management. The device includes at least one processing unit and at least one memory. The at least one memory is coupled to the at least one processing unit and stores instructions for execution by the at least one processing unit. The instructions, when executed by the at least one processing unit, cause the device to perform acts, the acts including: in response to receiving an access request for a logical storage address, determining a first virtual storage unit and a first address offset within the first virtual storage unit corresponding to the logical storage address; determining a first set of virtual storage units to which the first virtual storage unit belongs and a position of the first virtual storage unit in the first set of virtual storage units, where the first set of virtual storage units is mapped to a plurality of physical storage units evenly distributed across a first group of disks and including a plurality of virtual storage units, and data in the plurality of virtual storage units being distributed across the plurality of physical storage units in a round-robin manner; determining, from the plurality of physical storage units corresponding to the first set of virtual storage units and based on the position and the first address offset, a physical storage unit and a second address offset within the physical storage unit corresponding to the logical storage address; and performing, based on an identifier of the physical storage unit and the second address offset, a data access operation requested by the access request.

In a third aspect of the present disclosure, there is provided a computer program product being tangibly stored on a non-transitory computer-readable medium and including machine-executable instructions that, when executed by a device, cause the device to perform the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

In the various figures, the same or corresponding reference numerals indicate the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

In current storage systems, each of a plurality of disks is generally divided into a plurality of disk slices. By combining the plurality of disk slices from different disks into stripes in a disk array (e.g., an independent redundant disk array, RAID), the plurality of disks are organized into the disk array for management. In this case, the entire storage space is managed in fixed-size storage units composed of one or more stripes.

Physical storage units are usually allocated on demand. Since each physical storage unit is only associated with a few disks among a plurality of disks (for example, taking RAID1 as an example, each physical storage unit is only associated with two disks), I/O operations on this physical storage unit will only be served by these few disks. In some cases, data in certain physical storage units will be accessed frequently, which leads to an imbalance in the I/O load among different disks, thereby impacting the overall performance of the storage system.

According to an embodiment of the present disclosure, a solution for storage management is proposed. In this solution, a plurality of physical storage units evenly distributed across a plurality of disks is mapped to a set of virtual storage units and virtual storage units are allocated with a smaller granularity in the set of virtual storage units for storage space management. The data in the virtual storage units is distributed across the plurality of physical storage units in a round-robin manner. Then, according to this solution, storage space allocation, processing of access requests, and data migration between storage mediums with different performance are managed in units of virtual storage units. In addition, in this solution, the expansion of storage space and the rebuilding of data of failed disks are managed in units of physical storage units. In this manner, according to the embodiments of the present disclosure, the I/O loads on multiple disks can be balanced, thereby improving overall performance of a storage system.

Figure 1:
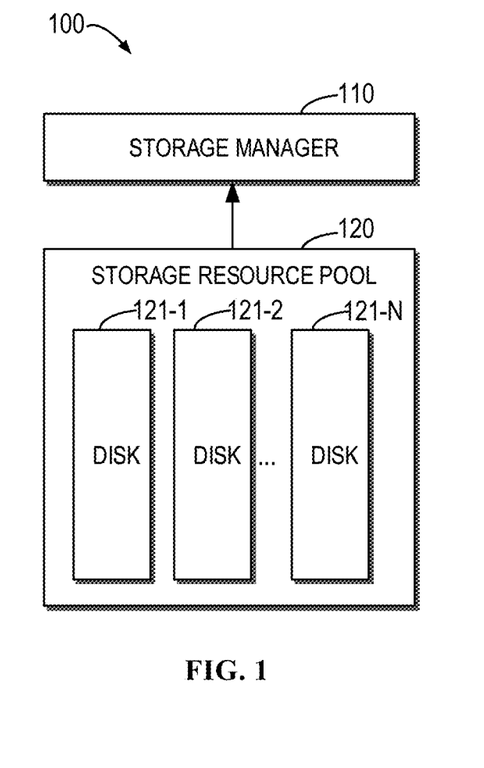
FIG. 1 illustrates a diagram of an example storage system in which embodiments of the present disclosure can be implemented.

Hereinafter, embodiments of the present disclosure will be described in detail with reference to the accompanying drawings. FIG. 1 illustrates a block diagram of an example storage system 100 in which embodiments of the present disclosure can be implemented. It should be understood that the structure of the environment 100 in FIG. 1 is illustrated only for the purpose of illustration, without suggesting any limitation to the scope of the present disclosure. For example, embodiments of the present disclosure can be applied to an environment different from the environment 100.

As shown in FIG. 1, the system 100 may include a storage manager 110 and a storage resource pool 120. The storage resource pool 120 may include a plurality of disks 121-1, 121-2, ... 121-N (collectively or individually referred to as "disk 121", where N≥1). The "disk" described herein may refer to any non-volatile storage medium currently known or to be developed in the future, such as a disk, an optical disk, or a solid state disk, and the like. The plurality of disks 121 may be built based on different storage mediums. The storage manager 110 may be configured to manage the storage resource pool 120. In some embodiments, the storage manager 110 may be divided into multiple modules so as to implement respective functions. In the following, the functions implemented by the storage manager 110 will be described in general without limiting the manner in which the modules of the storage manager 110 are divided.

In some embodiments, the storage manager 110 may divide each disk 121 in the storage resource pool 120 into a plurality of fixed-size disk slices (for example, the size of each disk slice may be 4 GB). The storage manager 110 may organize a plurality of disk slices on different disks to a disk array and maintain mapping information between the disk array and the plurality of disk slices. In some embodiments, stripes in the disk array are generally distributed as evenly as possible across the entire storage resource pool 120 such that the entire storage resource pool constitutes a fault domain. The reliability of the disk array can be guaranteed by limiting the number of disks N in the storage resource pool 120 (i.e., a fault domain).

In some embodiments, the type of the disk array may be related to the type of data stored. For example, when the plurality of disks 121 is used to store metadata associated with user data (the "metadata" described herein is used to record the address where the user data is located, attributes of the user data, and other information related to the user data), the plurality of disks 121 may be organized into a RAID1, where each stripe includes two disk slices from two different disks and the data in the two disk slices are mirror images of each other. As another example, when the plurality of disks 121 is used to store user data, the plurality of disks 121 may be organized into other types of disk arrays such as RAID 5. Hereinafter, some embodiments of the present disclosure will be described with RAID1 as an example. It should be understood that this is for example purposes only and is not intended to limit the scope of the disclosure.

In some embodiments, the storage manager 110 may group one or more stripes in the disk array into a fixed-size physical storage unit and maintain mapping information between the physical storage unit and the disk array (or a plurality of disk slices). Taking RAID1 as an example, each physical storage unit may be composed of two disk slices from two different disks and the data in the two disk slices are mirror images of each other. That is, each physical storage unit may be used to store 4 GB of data, for example.

In some embodiments, the storage manager 110 may map a plurality of physical storage units into a virtual storage space and divide the virtual storage space into a plurality of virtual storage units with a smaller granularity. Hereinafter, the virtual storage space is therefore also referred to as a "set of virtual storage units". The storage manager 110 may maintain mapping information between physical storage units and a set of virtual storage units (and virtual storage units therein). In some embodiments, the number of the plurality of physical storage units mapped to one set of virtual storage units may be determined based on an upper limit of the number of disks N in the storage resource pool 120 (i.e., one fault domain) and the width of the disk array. The plurality of the physical storage units mapped to one set of virtual storage units should be evenly distributed as much as possible on the plurality of disks 121 in the storage resource pool 120 as much as possible. The size of each virtual storage unit is configurable, which is usually below the size of a physical storage unit. For example, in some embodiments, the size of each virtual storage unit is 128 MB.

In some embodiments, the storage manager 110 may further map the virtual storage unit to a logical address space for use by an upper-layer module or an application thereof (not shown in FIG. 1). That is, based on a logical storage address, the upper-layer module or application may perform data access (for example, a read operation or a write operation) for a virtual storage unit.

Figure 2:
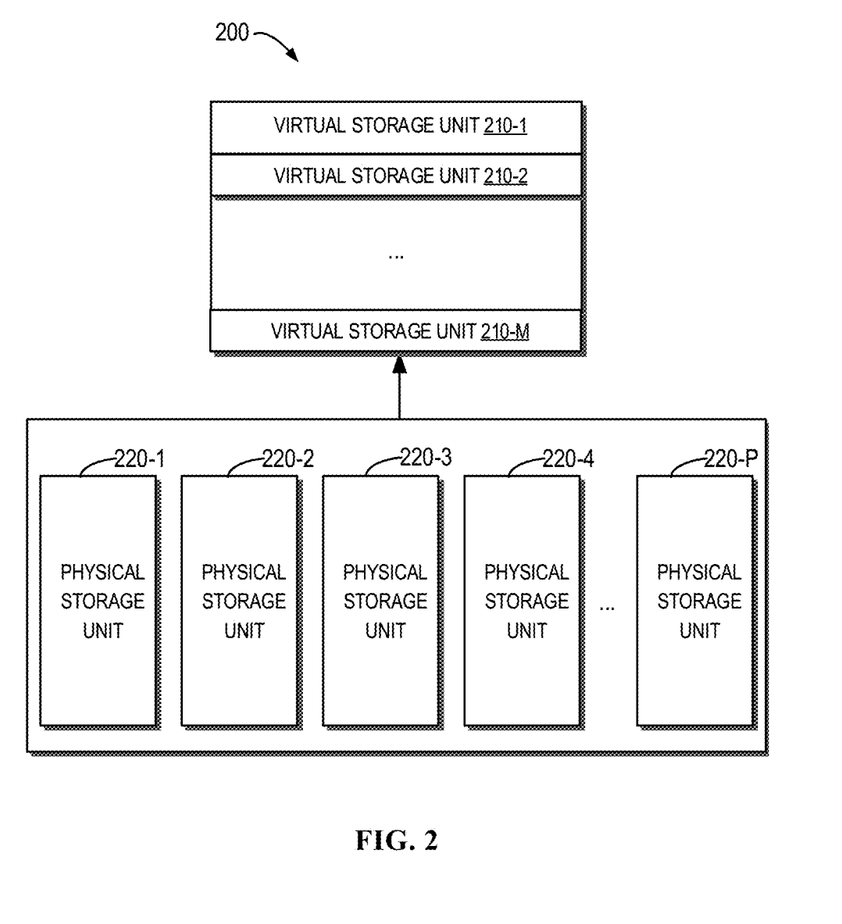
FIG. 2 illustrates a schematic diagram of a topology relationship among various storage units according to an embodiment of the present disclosure.

FIG. 2 shows a schematic diagram of a topology relationship among various storage units according to an embodiment of the present disclosure. FIG. 2 shows a set of virtual storage units 200, which is mapped to a plurality of physical storage units 220-1, 220-2 . . . 220-P (collectively or individually referred to as "physical storage units 220", where P>1). For example, the plurality of physical storage units 220 are uniformly distributed across a plurality of disks 121 as shown in FIG. 1. In some embodiments, the number P of the plurality of physical storage units 220 mapped to the set of virtual storage units 200 may be determined based on an upper limit of the number of disks N in the storage resource pool 120 (i.e., one fault domain) and the width of a disk array composed of the plurality of disks 121. Taking RAID 1 as an example, its width is two (that is, each stripe includes two disk slices). Assuming that the upper limit of N is twenty-five, the number P of the physical storage units 220 corresponding to the set of virtual storage units 200 may be twelve.

As shown in FIG. 2, the set of virtual storage units 200 may be divided into a series of slots 210-1, 210-2, . . . 210-M (where M>1) for virtual storage units in smaller granularity and each slot may correspond to one virtual storage unit. In this article, "slot" and "virtual storage unit" may be used interchangeably in some cases.

Figure 3:
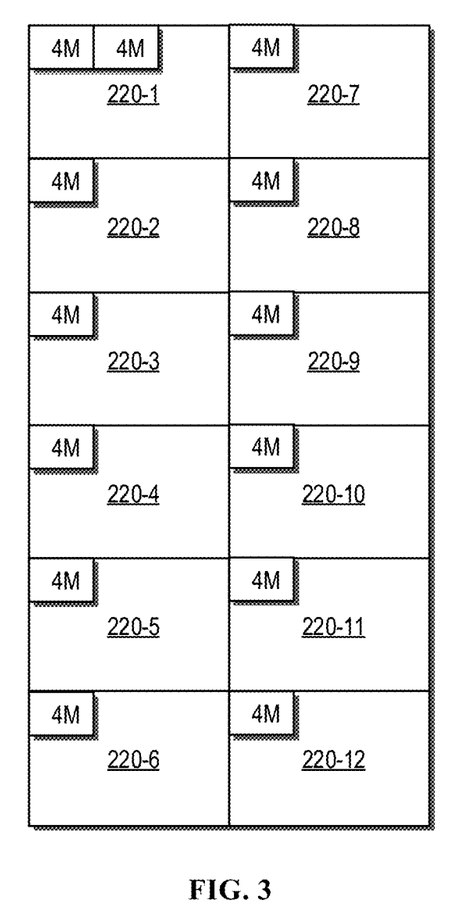
FIG. 3 illustrates a schematic diagram of distributing data in a virtual storage unit across a plurality of physical storage units in a round-robin manner according to an embodiment of the present disclosure.

In some embodiments, the data in the plurality of virtual storage units 210 in the set of virtual storage units 200 may be distributed across the plurality of physical storage units 220 in a round-robin manner. FIG. 3 shows a schematic diagram of distributing data in a virtual storage unit to a plurality of physical storage units in a round-robin manner according to an embodiment of the present disclosure.

FIG. 3 shows a plurality of physical storage units 220 as shown in FIG. 2, where P is twelve, for example. In the example shown in FIG. 3, the data in the virtual storage unit 210 shown in FIG. 2 may be distributed across all the physical storage units 220 in the set of virtual storage units 200 in a round-robin manner. In some embodiments, the data distribution granularity may be configurable, for example, 2 Mb, 4 MB, 8 MB, and on the like. In the example shown in FIG. 3, the data distribution granularity is, for example, 4 MB, and the set of virtual storage units 200 includes twelve physical storage units 220.

Taking the first virtual storage unit 210-1 in the set of virtual storage units 200 as an example, the first 4 MB of data in the virtual storage unit 210-1 may be placed on the physical storage unit 220-1, the second 4 MB of data in the virtual storage unit 210-1 may be placed on physical storage unit 220-2, and so on, the twelfth 4 MB of data in virtual storage unit 210-1 may be placed on the physical storage unit 220-12, thus the first round of data placement is completed. In the next round, the thirteenth 4 MB of data in the virtual storage unit 210-1 will be placed on the physical storage unit 220-1 again . . . the subsequent data in the virtual storage unit 210-1 and data in the other virtual storage units 210 subsequent to the virtual storage unit 210-1 may be distributed across all physical storage units 220 in this manner.

As will be described in further detail below, according to embodiments of the present disclosure, storage space allocation, processing of access requests and data migration among storage mediums with different performance may be managed in units of virtual storage units, and may manage expansion of the storage space and data rebuild of the failed disk in units of physical storage units. In this manner, I/O loads on a plurality of disks can be balanced according to the embodiments of the present disclosure, thereby improving the overall performance of the storage system.

Figure 4:
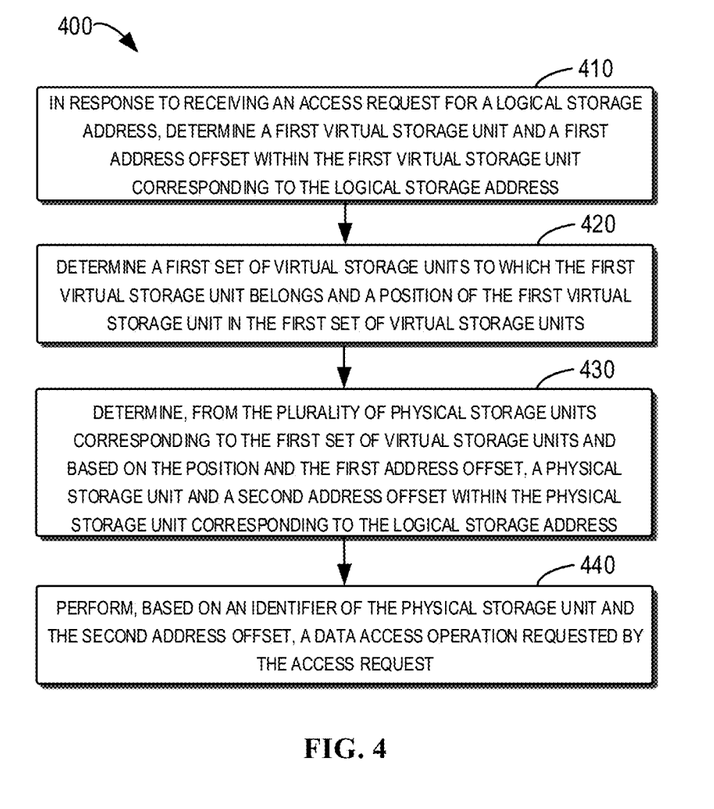
FIG. 4 illustrates a flowchart of an example method for storage management according to an embodiment of the present disclosure.

FIG. 4 illustrates a flowchart of an example method 400 for storage management according to an embodiment of the present disclosure. For example, the method 400 may be performed by the storage manager 110 shown in FIG. 1. It should be understood that the method 400 may further include additional acts not shown and/or may omit some shown acts, and the scope of the disclosure is not limited in this regard.

At block 410, in response to receiving an access request for a logical storage address, the storage manager 110 may determine a virtual storage unit (also referred to herein as the "first virtual storage unit") and an address offset within the virtual storage unit (also referred to herein as the "first address offset") corresponding to the logical storage address.

In some embodiments, an identifier (ID) and the first address offset of the first virtual storage unit may be determined based on the logical storage address and the size of each virtual storage unit. For example, $$VU\_ID = LBA/VU\_SIZE \quad (1)$$

$$VU\_OFFSET = LBA \% VU\_SIZE \quad (2)$$

where LBA represents a logical storage address, VU_SIZE represents the size of each virtual storage unit (for example, 128 MB), VU_ID represents an ID of a first virtual storage unit and VU_OFFSET represents a first address offset.

At block 420, the storage manager 110 may determine a set of virtual storage units (also referred to herein as a "first set of virtual storage units") to which the first virtual storage unit belongs and the position of the first virtual storage unit in the set of virtual storage units (for example, the ID of the corresponding slot).

In some embodiments, the storage manager 110 may maintain a table of descriptive information on the virtual storage unit, where the ID of the set of virtual storage units to which each virtual storage unit belongs and the position of each virtual storage unit in the set of virtual storage units to which it belongs (for example, the ID of the corresponding slot) are recorded in one entry of this table and this entry is indexed by the ID of this virtual storage unit. In some embodiments, the storage manager 110 may search in the table of descriptive information by using the ID of the first virtual storage unit as an index, so as to determine the ID of the set of virtual storage units to which the first virtual storage unit belongs and the ID of the slot corresponding to the first virtual storage unit in the set of virtual storage units.

At block 430, the storage manager 110 may determine, from the plurality of physical storage units corresponding to the first set of virtual storage units and based on the determined position and the first address offset, a physical storage unit and an address offset within the physical storage unit (also referred to herein as the "second address offset") corresponding to the logical storage address.

In some embodiments, as described above in combination with FIG. 3, the first set of virtual storage units may be mapped to a plurality of physical storage units and include a plurality of virtual storage units. The data in the plurality of virtual storage units in the first set of virtual storage units is distributed across the plurality of physical storage units in a round-robin manner. It is assumed that the size of each physical storage unit is 4 GB and the data distribution granularity is 4 MB. In some embodiments, the identifier PU_ID of the physical storage unit to which the $n^{th}$ 4 MB data in the $m^{th}$ virtual storage unit 210-$m$ is distributed and the address offset PU_OFFSET of the data in the physical storage unit may be determined based on the following formula:

$$PU\_ID = ((m-1)*4\ GB/4\ MB + n) \bmod NUMBERS\_OF\_PU\_IN\_VC \quad (3)$$

$$PU\_OFFSET = \operatorname{ceil}(((m-1)*4\ GB/4\ MB + n)/NUMBERS\_OF\_PU\_IN\_VC) \quad (4)$$

where, NUMBERS_OF_PU_IN_VC represents the number of physical storage units corresponding to the set of virtual storage units (for example, twelve in the example shown in FIG. 3).

At block 440, based on the determined ID and the second address offset of the physical storage unit, the storage manager 110 may perform a data access operation requested by the access request. For example, the data operation may include any one of a read operation and a write operation.

In some embodiments, the storage manager 110 may manage storage space allocation in units of virtual storage units. For example, when the storage manager 110 determines that the currently allocated virtual storage unit is used up and there is new data that needs to be stored, the storage manager 110 may allocate a new virtual storage unit for storing the new data.

In order to allocate a new virtual storage unit, the storage manager 110 may determine whether the new virtual storage unit is able to be allocated from the current set of virtual storage units. When the storage manager 110 determines that there are free slots (that is, slots which are not used by the virtual storage units) in the current set of virtual storage units, the storage manager 110 may allocate the virtual storage unit corresponding to the free slots from the current set of virtual storage units.

When determining that there is no free slot (i.e., a slot which is not used by the virtual storage unit) in the current set of virtual storage units, the storage manager 110 may determine that the new virtual storage unit is unable to be allocated from the current set of virtual storage units. In this case, the storage manager 110 may create a new set of virtual storage units (also referred to herein as the "second set of virtual storage units") by utilizing a plurality of physical storage units on a plurality of disks (for example, a plurality of disks 121 as shown in FIG. 1). For example, a new set of virtual storage units may be built in a similar manner to that of the set of virtual storage units 200 shown in FIG. 2. In some embodiments, when there is not a sufficient number of physical storage units on the plurality of disks (e.g., in a case where an upper limit of N is twenty-five and the width of disk array is two, the number of physical storage units is less than twelve), a new set of virtual storage units is unable to be created and therefore a new set of virtual storage units is unable to be allocated. Alternatively, in other embodiments, when there is not a sufficient number of physical storage units on the plurality of disks (e.g., in a case where an upper limit of N is twenty-five and the width of disk array is two, the number of physical storage units is less than twelve), a new set of virtual storage units may be created based on the remaining physical storage units. In response to the second set of virtual storage units is created, the storage manager 110 may allocate a new virtual storage unit from the second set of virtual storage units (e.g., may be corresponding to the first slot of the second set of virtual storage units).

In some embodiments, when one or more new disks are added to the storage resource pool 120 shown in FIG. 1, in order to cause the physical storage units to be distributed as evenly as possible on multiple disks in the storage resource pool 120, the storage manager 110 may perform a rebalance operation to the physical storage units. That is, the storage manager 110 may migrate a part of the physical storage units to one or more new disks. Because the storage manager 110 only changes the location of part of the physical storage units, the storage manager 110 only needs to modify the location information of this part of the physical storage units without modifying the mapping relationship between the physical storage units and the set of virtual storage units (and/or the virtual storage units).

Figure 5A:
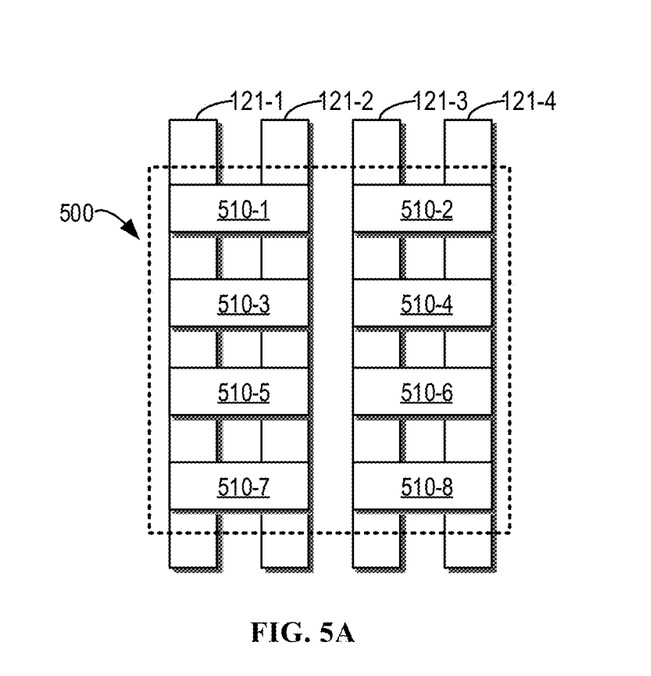
FIGS. 5A and 5B illustrate schematic diagrams of redistributing a plurality of physical storage units after a storage resource pool expansion according to an embodiment of the present disclosure.
Figure 5B:
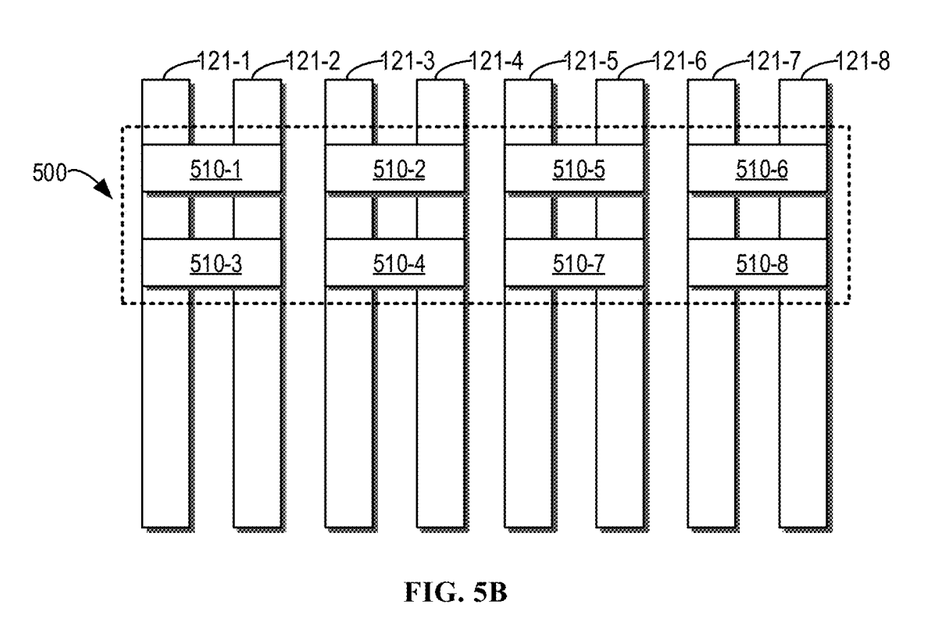

FIGS. 5A and 5B show schematic diagrams of rebuilding a plurality of physical storage units after a storage resource pool expansion according to an embodiment of the present disclosure. In the examples shown in FIGS. 5A and 5B, it is assumed that the type of disk array is RAID 1 and the upper limit of the number of disks in the storage resource pool (that is, a fault domain) is sixteen.

As shown in FIG. 5A, the current storage resource pool includes, for example, only four disks 121-1, 121-2, 121-3, and 121-4. The current set of virtual storage units 500 includes eight physical storage units 510-1, 510-2, . . . 510-8 (collectively or individually referred to as "physical storage unit set 510"), where each physical storage unit 510 includes two disk slices that are mirror images of each other.

As shown in FIG. 5B, four new disks 121-5, 121-6, 121-7, and 121-8 are added to the current storage resource pool. The four physical storage units 510-5, 510-6, 510-7, and 510-8 of the eight physical storage units 510 are migrated to the new disks 121-5, 121-6, 121-7, and 121-8. The eight physical storage units 510-1, 510-2, . . . , 510-8 in the set of virtual storage units 500 after the rebalance operation are evenly distributed on the eight disks 121-1, 121-2, 121-3 . . . . in 121-8. Since only the locations of the physical storage units 510-5, 510-6, 510-7, and 510-8 are changed, the storage manager 110 only needs to modify the location information of the physical storage units without modifying the mapping relationship between the physical storage units 510 and the set of virtual storage units 500 (and the virtual storage units therein).

In some embodiments, when a disk in the storage resource pool 121 shown in FIG. 1 fails, the storage manager 110 needs to rebuild the data on the failed disk with a spare disk. Taking RAID 1 as an example, since each stripe includes two disk slices that are mirror images of each other, the storage manager 110 only needs to copy data from the disk slice not failed to the corresponding disk slice of the spare disk. In some embodiments, before performing the above data rebuilding, the storage manager 110 may first determine at least one physical storage unit associated with the failed disk, and then determine a range of logical storage addresses corresponding to the at least one physical storage unit. For example, the process of determining the range of the logical storage addresses and the process of determining a physical storage unit based on a logical storage address described above in conjunction with FIG. 3 are inverse processes to each other, which are not repeated herein. The storage manager 110 may lock the determined range of the logical storage addresses, so as to disable data access operations directed to the range of the logical storage addresses. Then, the storage manager 110 may perform the above-mentioned data rebuilding and release the lock after the data rebuilding is completed to enable data access operations directed to the range of the logical storage addresses. In this way, it is possible to prevent data inconsistency due to other I/O operations during a data rebuilding.

In some embodiments, disks in a storage system may be built based on storage mediums with different capabilities. A disk with higher performance may be used to build a set of virtual storage units with higher performance and a disk with lower performance may be used to build a set of virtual storage units with lower performance. In some embodiments, the storage manager 110 may monitor the popularity of the virtual storage units of the set of virtual storage units accessed. For example, the number of times a virtual storage unit is accessed at a time interval that is below a threshold time interval (for example, a predetermined time window) may be used as a matrix of the popularity of the virtual storage unit accessed, or the frequency in which the virtual storage unit is accessed, the number of times the virtual storage unit is accessed within a specific time interval or other indicators may be used as a matrix of the popularity of the virtual storage unit accessed. When the access popularity of a certain virtual storage unit exceeds a first threshold, the storage manager 110 may migrate the virtual storage unit to a set of virtual storage units with higher performance. Similarly, when the popularity of a certain virtual storage unit is below a second threshold (for example, the second threshold is lower than the first threshold), the storage manager 110 may migrate the virtual storage unit to the set of virtual storage units with lower performance.

Figure 6:
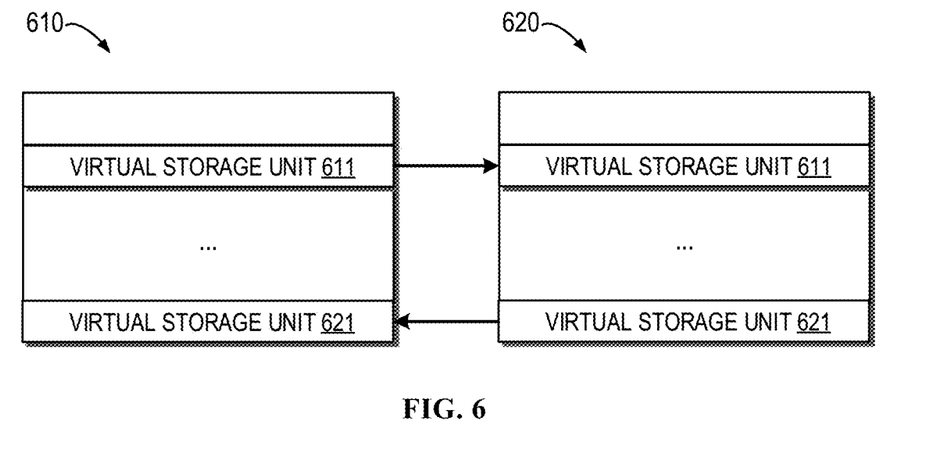
FIG. 6 illustrates a schematic diagram of migration of a virtual storage unit between a plurality of a set of virtual storage units with different performances according to an embodiment of the present disclosure.

FIG. 6 illustrates a schematic diagram of migration of a virtual storage unit between a plurality of sets of virtual storage units with different performances according to an embodiment of the present disclosure. FIG. 6 shows a set of virtual storage units 610 with lower performance, which includes a virtual storage unit 611. In addition, FIG. 6 illustrates a set of virtual storage units 620 with higher performance, which includes a virtual storage unit 621. In some embodiments, when determining that the popularity of the virtual storage unit 611 accessed exceeds the first threshold, the storage manager 110 may migrate data in the virtual storage unit 611 from the set of virtual storage units 610 to the set of virtual storage units 620 with higher performance. In some embodiments, when determining that the popularity of the virtual storage unit 621 accessed is below a second threshold (for example, the second threshold is lower than the first threshold), the storage manager 110 may migrate data in the set of virtual storage units 621 from the set of virtual storage units 620 to the set of virtual storage units 610 with lower performance. In this way, according to the embodiments of the present disclosure, higher access efficiency can be achieved by storing data with higher access popularity in a storage medium with a higher access speed.

As can be seen from the above description, the embodiments of the present disclosure propose a solution for storage management. This solution maps a plurality of physical storage units evenly distributed across a plurality of disks to a set of virtual storage units and allocates virtual storage units with a smaller granularity in the set of virtual storage units for storage space management. The data in the virtual storage units is distributed across the plurality of physical storage units in a round-robin manner. Then, in this solution, storage space allocation, processing of access requests, and data migration between storage mediums with different performance are managed in units of virtual storage units. In addition, this solution manages storage space expansion and data rebuilding of failed disks in units of physical storage units. In this manner, according to the embodiments of the present disclosure, the I/O loads on a plurality of disks can be balanced, thereby improving the overall performance of the storage system.

Figure 7:
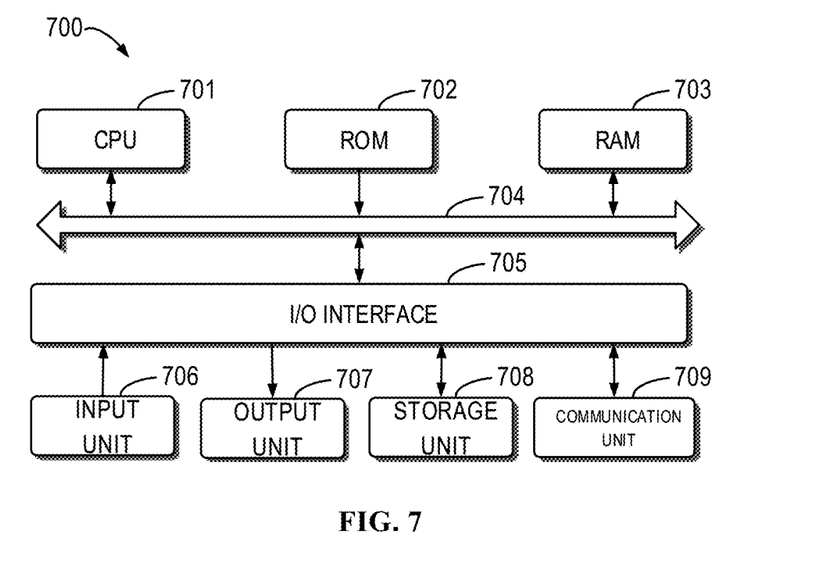
FIG. 7 illustrates a schematic block diagram of an example device for implementing embodiments of the present disclosure.

FIG. 7 shows a schematic block diagram of an example device 700 for implementing embodiments of the present disclosure. For example, the storage manager 110 shown in FIG. 1 can be implemented by the device 700. As shown, the device 700 includes a central processing unit (CPU) 701, which can execute various suitable actions and processing based on the computer program instructions stored in a read-only memory (ROM) 702 or computer program instructions loaded in the random-access memory (RAM) 703 from a storage page 708. The RAM 703 may also store all kinds of programs and data required by the operations of the device 700. The CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as a keyboard, a mouse and the like; an output unit 707, e.g., various kinds of display and loudspeakers etc.; a storage page 708, such as a magnetic disk and an optical disk etc.; and a communication unit 709, such as a network card, a modem, a wireless transceiver, and the like. The communication unit 709 allows the device 700 to exchange information/data with other devices via a computer network, such as Internet, and/or various telecommunication networks.

The above described procedures and processing, such as the method 300, can also be executed by the processing unit 701. For example, in some embodiments, the method 300 can be implemented as a computer software program tangibly included in the machine-readable medium, e.g., the storage page 708. In some embodiments, the computer program may be partially or fully loaded and/or mounted to the device 700 via the ROM 702 and/or communication unit 709. When the computer program is loaded to the RAM 703 and executed by the CPU 701, one or more steps of the above described method 300 can be implemented.

The present disclosure may be a method, a device, a system and/or a computer program product. The computer program product may include a computer-readable storage medium, on which the computer-readable program instructions for executing various aspects of the present disclosure are loaded.

The computer-readable storage medium may be a tangible device that maintains and stores instructions utilized by the instruction executing devices. The computer-readable storage medium may be, but is not limited to, an electrical storage device, a magnetic storage device, an optical storage device, an electromagnetic storage device, a semiconductor storage device or any appropriate combination of the above. More concrete examples of the computer-readable storage medium (non-exhaustive list) include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, a floppy disk, mechanical coding devices, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions may be downloaded from the computer-readable storage medium to each computing/processing device, or to an external computer or external storage via Internet, local area network, wide area network and/or wireless network. The network may include a copper-transmitted cable, an optical fiber transmission, a wireless transmission, a router, a firewall, a switch, a network gate computer and/or an edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combination of one or more programming languages, where the programming languages includes object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., a programmable logic circuit, a field programmable gate array (FPGA) or a programmable logic array (PLA). The electronic circuit can execute computer-readable program instructions to implement various aspects of the present disclosure.

Various aspects of the present disclosure are described herein with reference to flow chart and/or block diagram of methods, devices (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing devices to manufacture a machine, such that the instructions that, when executed by the processing unit of the computer or other programmable data processing apparatuses, generate a device for implementing functions/actions stipulated in one or more blocks in the flow chart and/or block diagram. The computer-readable program instructions may also be stored in the computer-readable storage medium and cause the computer, programmable data processing device and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order dependent on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method of storage management, comprising:
    in response to receiving an access request for a logical storage address, determining a first virtual storage unit and a first address offset within the first virtual storage unit corresponding to the logical storage address;
    determining a first set of virtual storage units to which the first virtual storage unit belongs and a position of the first virtual storage unit in the first set of virtual storage units,
    the first set of virtual storage units being mapped to a plurality of physical storage units evenly distributed across a first group of disks and comprising a plurality of virtual storage units, and data in the plurality of virtual storage units being distributed across the plurality of physical storage units in a round-robin manner;
    determining, from the plurality of physical storage units corresponding to the first set of virtual storage units and based on the position and the first address offset, a physical storage unit and a second address offset within the physical storage unit corresponding to the logical storage address; and
    performing, based on an identifier of the physical storage unit and the second address offset, a data access operation requested by the access request.

2. The method of claim 1, wherein each of the first group of disks is divided into a plurality of disk slices and one of the plurality of physical storage units comprises at least two disk slices from different disks of the first group of disks.

3. The method of claim 1, further comprising:
    determining whether to allocate a new virtual storage unit;
    in response to determining to allocate the new virtual storage unit, determining whether the new virtual storage unit is able to be allocated from the first set of virtual storage units; and
    in response to determining that the new virtual storage unit is able to be allocated from the first set of virtual storage units, allocating the new virtual storage unit from the first set of virtual storage units.

4. The method of claim 3, further comprising:
    in response to determining that the new virtual storage unit is unable to be allocated from the first set of virtual storage units, creating a second set of virtual storage units; and
    allocating the new virtual storage unit from the second set of virtual storage units.

5. The method of claim 1, further comprising:
    in response to a new disk being added to the first group of disks, transferring data in at least a part of the plurality of physical storage units to the new disk, such that the plurality of physical storage units are evenly distributed across the first group of disks comprising the new disk.

6. The method of claim 1, further comprising:
    in response to a failure of at least one of the first set of disks, determining, from the plurality of physical storage units, at least one physical storage unit associated with the at least one disk of the first set of disks;
    determining a range of logical storage addresses corresponding to the at least one physical storage unit;
    disabling data access operations directed to the range of the logical storage addresses;
    rebuilding data in the at least one disk of the first set of disks into a spare disk; and
    in response to completion of the rebuilding of the data, enabling data access operations directed to the range of the logical storage addresses.

7. The method of claim 1, further comprising:
    determining popularity of a second virtual storage unit of the first set of virtual storage units accessed; and
    in response to the popularity exceeding a threshold, migrating the second virtual storage unit from the first set of virtual storage units to a second set of virtual storage units,
    wherein the second set of virtual storage units is mapped to a plurality of physical storage units evenly distributed across a second group of disks, and performance of the second group of disks exceeds performance of the first group of disks.

8. The method of claim 1, further comprising:
    determining popularity of a second virtual storage unit of the first set of virtual storage units accessed; and
    in response to the popularity being below a threshold, migrating the second virtual storage unit from the first set of virtual storage units to a third set of virtual storage units,
    wherein the third set of virtual storage units is mapped to a plurality of physical storage units evenly distributed across a third group of disks, and performance of the first group of disks exceeds performance of the third group of disks.

9. The method of claim 1, wherein the data access operation comprises any one of a read operation and a write operation.

10. An electronic device, comprising:
    at least one processing unit; and
    at least one memory coupled to the at least one processing unit and storing instructions for execution by the at least one processing unit, the instructions, when executed by the at least one processing unit, causing the device to perform acts comprising:
        in response to receiving an access request for a logical storage address, determining a first virtual storage unit and a first address offset within the first virtual storage unit corresponding to the logical storage address;
        determining a first set of virtual storage units to which the first virtual storage unit belongs and a position of the first virtual storage unit in the first set of virtual storage units,
        the first set of virtual storage units being mapped to a plurality of physical storage units evenly distributed across a first group of disks and comprising a plurality of virtual storage units, and data in the plurality of virtual storage units being distributed across the plurality of physical storage units in a round-robin manner;

determining, from the plurality of physical storage units corresponding to the first set of virtual storage units and based on the position and the first address offset, a physical storage unit and a second address offset within the physical storage unit corresponding to the logical storage address; and performing, based on an identifier of the physical storage unit and the second address offset, a data access operation requested by the access request.

11. The device of claim 10, wherein each of the first group of disks is divided into a plurality of disk slices and one of the plurality of physical storage units comprises at least two disk slices from different disks of the first group of disks.

12. The device of claim 10, wherein the acts further comprises:

determining whether to allocate a new virtual storage unit;

in response to determining to allocate the new virtual storage unit, determining whether the new virtual storage unit is able to be allocated from the first set of virtual storage units; and in response to determining that the new virtual storage unit is able to be allocated from the first set of virtual storage units, allocating the new virtual storage unit from the first set of virtual storage units.

13. The device of claim 12, wherein the acts further comprise:

in response to determining that the new virtual storage unit is unable to be allocated from the first set of virtual storage units, creating a second set of virtual storage units; and allocating the new virtual storage unit from the second set of virtual storage units.

14. The device of claim 10, wherein the acts further comprise:

in response to a new disk being added to the first group of disks, transferring data in at least a part of the plurality of physical storage units to the new disk, such that the plurality of physical storage units are evenly distributed across the first group of disks comprising the new disk.

15. The device of claim 10, wherein the acts further comprise:

in response to a failure of at least one of the first set of disks, determining, from the plurality of physical storage units, at least one physical storage unit associated with the at least one disk;

determining a range of logical storage addresses corresponding to the at least one physical storage unit;

disabling data access operations directed to the range of the logical storage addresses;

rebuilding data in the at least one disk into a spare disk; and in response to completion of the rebuilding of the data, enabling data access operations directed to the range of the logical storage addresses.

16. The device of claim 10, wherein the acts further comprise:

determining popularity of a second virtual storage unit of the first set of virtual storage units accessed; and in response to the popularity exceeding a threshold, migrating the second virtual storage unit from the first set of virtual storage units to a second set of virtual storage units, wherein the second set of virtual storage units is mapped to a plurality of physical storage units evenly distributed across a second group of disks, and performance of the second group of disks exceeds performance of the first group of disks.

17. The device of claim 10, wherein the acts further comprise:

determining popularity of a second virtual storage unit of the first set of virtual storage units accessed; and in response to the popularity being below a threshold, migrating the second virtual storage unit from the first set of virtual storage units to a third set of virtual storage units, wherein the third set of virtual storage units is mapped to a plurality of physical storage units evenly distributed across a third group of disks, and performance of the first group of disks exceeds performance of the third group of disks.

18. The device of claim 10, wherein the data access operation comprises any one of a read operation and a write operation.

19. A computer program product having a non-transitory computer readable medium which stores a set of instructions to perform storage management; the set of instructions, when carried out by computerized circuitry, causing the computerized circuitry to perform a method of:

in response to receiving an access request for a logical storage address, determining a first virtual storage unit and a first address offset within the first virtual storage unit corresponding to the logical storage address;

determining a first set of virtual storage units to which the first virtual storage unit belongs and a position of the first virtual storage unit in the first set of virtual storage units, the first set of virtual storage units being mapped to a plurality of physical storage units evenly distributed across a first group of disks and comprising a plurality of virtual storage units, and data in the plurality of virtual storage units being distributed across the plurality of physical storage units in a round-robin manner;

determining, from the plurality of physical storage units corresponding to the first set of virtual storage units and based on the position and the first address offset, a physical storage unit and a second address offset within the physical storage unit corresponding to the logical storage address; and performing, based on an identifier of the physical storage unit and the second address offset, a data access operation requested by the access request.

* * * * *